UNITED STATES PATENT OFFICE.

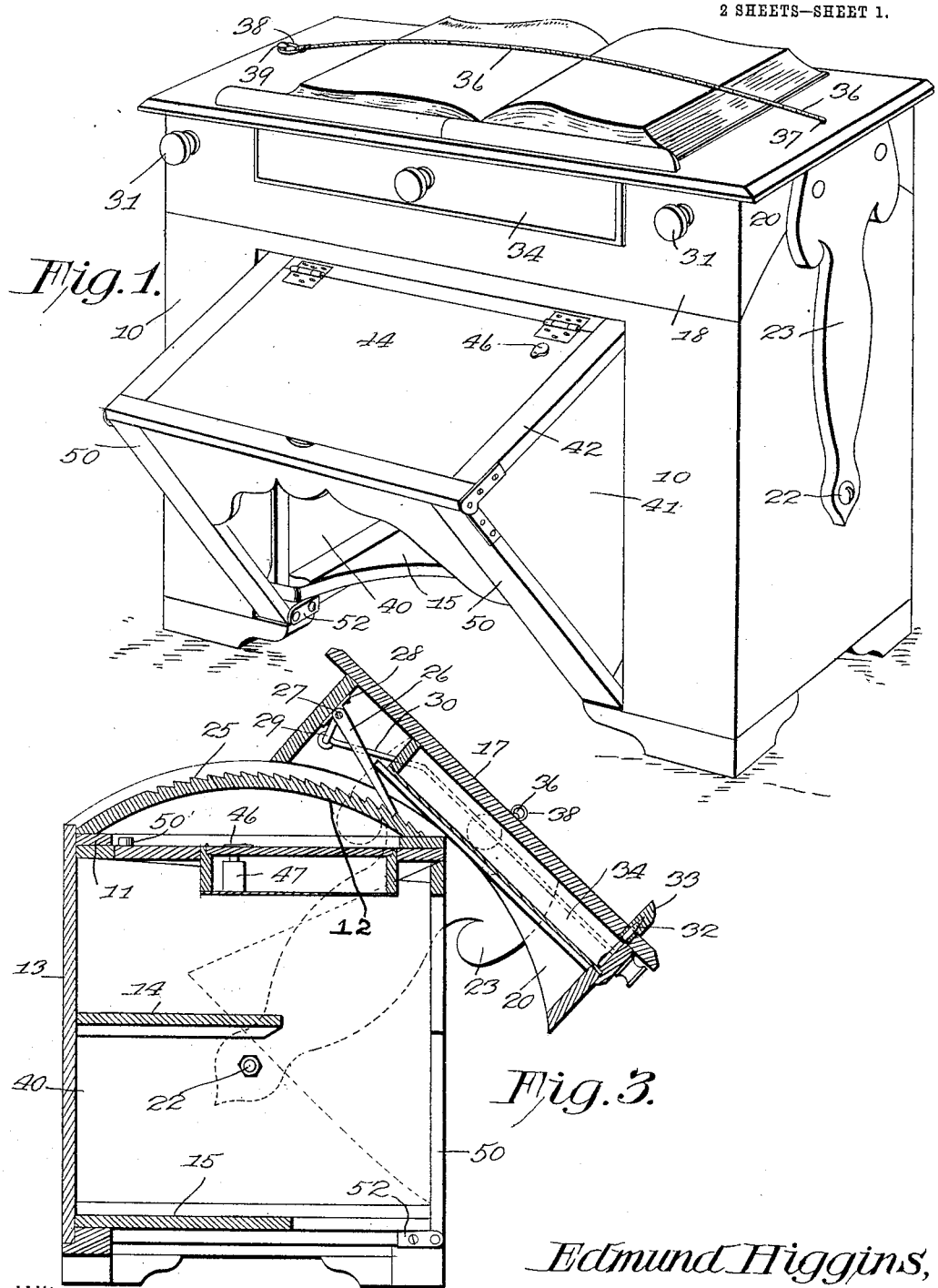

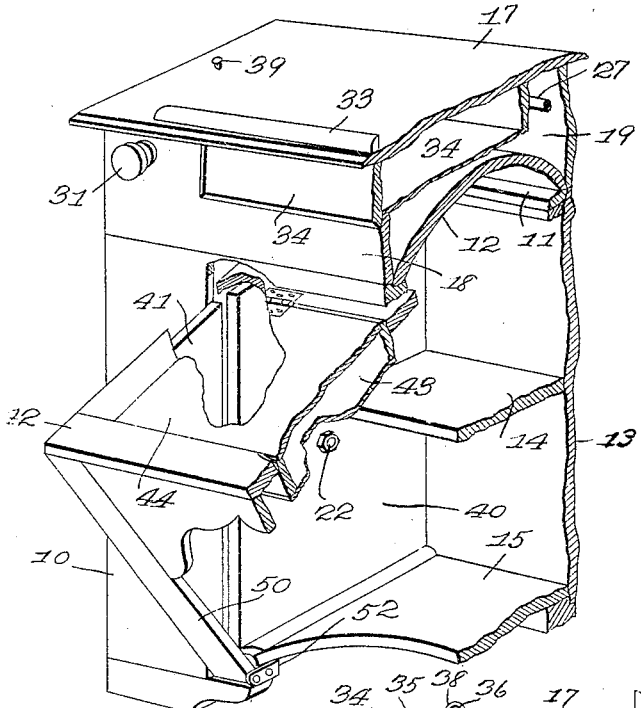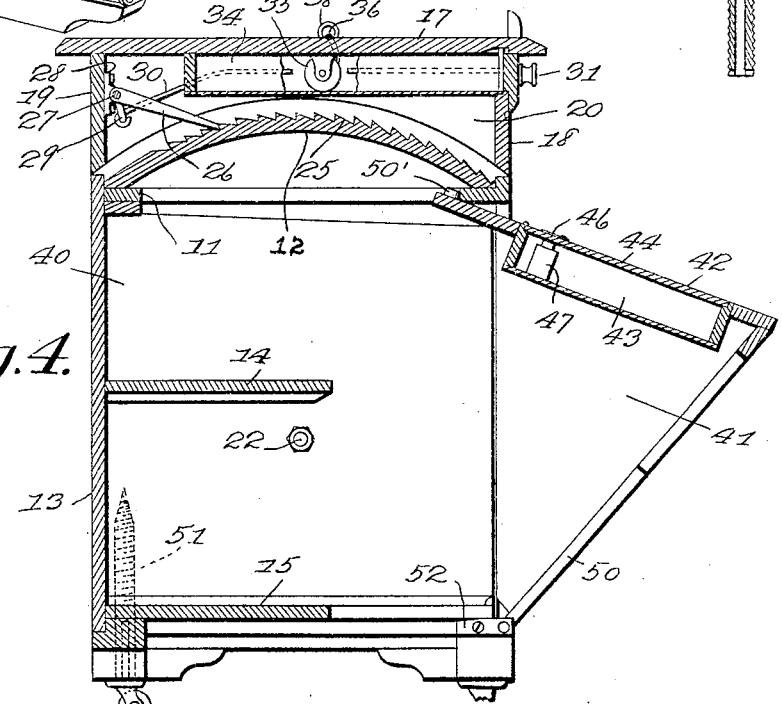

EDMUND HIGGINS, OF SOLDIERS HOME, CALIFORNIA.

COMBINED TABLE AND DESK.

No. 803,485.       Specification of Letters Patent.       Patented Oct. 31, 1905.

Application filed April 26, 1905. Serial No. 257,502.

*To all whom it may concern:*

Be it known that I, EDMUND HIGGINS, a citizen of the United States, residing at Soldiers Home, in the county of Los Angeles and State of California, have invented a new and useful Combined Table and Desk, of which the following is a specification.

This invention relates to reading and writing desks, and has for one of its objects to provide a novel form of desk on which heavy volumes may be easily examined and read without the necessity of bending over the desk.

A further object of the invention is to provide a reading or other desk having a tiltable top arranged for the support of a book or the like and so arranged that the top may be adjusted to any desired angle in order that the upper portions of the leaves of the book may be drawn within convenient reading distance, the top being arranged for gradual adjustment as the reading progresses.

A further object of the invention is to provide a novel means for retaining the leaves of the book in flat open position at any required point.

A still further object of the invention is to provide a combined reading and writing desk in which a writing table or surface is arranged at a convenient height and normally is concealed within the interior of the desk in order that the top of the desk may be used for reading purposes.

A still further object of the invention is to provide a desk of the knockdown variety in which the parts may be readily detached or assembled.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a desk constructed in accordance with the invention. Fig. 2 is a sectional perspective view of the desk. Fig. 3 is a transverse sectional view of the desk, showing the top tilted forward. Fig. 4 is a similar view showing the writing desk or surface drawn out to position for use. Fig. 5 is a detail sectional view of one of the assembling-bolts, which also serves for the reception of the stem of a caster.

Similar numerals of reference are employed to indicate corresponding parts throughout the several figures of the drawings.

The frame of the desk includes hollow end pedestals 10, which may be made sufficiently wide to receive drawers in the usual manner, and the pedestals are united by cross-bars 11, which support a curved partition 12, forming a part of the rigid frame. The back 13 of the desk forms a part of the pedestals and is connected to the rear edge of the partition 12, while between the two pedestals are horizontally-disposed shelves 14 and 15, which strengthen and brace the structure, the lower shelf 15 serving also as a foot-rest.

On the curved top of the partition 12 is arranged a tiltable top 17 of the desk, said top having a flat upper surface for the reception of books or other articles and with vertical front and rear walls 18 and 19, respectively, that are connected by curved end walls 20, the lower edges of which follow the contour of the partition 12, so that when the upper surface 17 is in a horizontal position the sides, front, and rear members of the desk-top will be in alinement with the corresponding members of the fixed portion of the desk, as shown in Fig. 1.

Extending through the vertical inner and outer walls of each of the pedestals 10 is a bolt 22, and the curved surfaces of the partition 12 and the ends 20 of the desk-top are struck on lines concentric with the axis of said bolts. Each bolt forms a pivotal support for an arm 23, the upper end of which is rigidly secured to one of the end walls of the desk-top, and the latter is thus held and supported independently of the partition 12 and the remaining portion of the frame proper, so that it may be swung to any angular position from the horizontal in order that a book or other article on its flat upper face may be brought within convenient reading distance.

The partition 12 carries a pair of racks 25, having ratchet-teeth with which may engage two pawls 26, that are rigidly connected to a rock-shaft 27, adapted to suitable bearings formed in brackets 28 on the inner face of the rear wall of the desk-top. To the shaft 27 are secured rocker-arms 29, that are connected by rods 30 to knobs or handles 31, that are arranged at the front of the desk-top, as shown in Fig. 1, and by pulling forward on one or both knobs the pawls 26 may be lifted from engagement with the racks and the desk-top drawn forward to any angular position, and when the desired position has been reached the knobs are released and the pawls moved into engagement with the racks, locking the desk-top from further movement. To restore the top to horizontal position, it is merely necessary to push said top backward, the pawls clicking over the racks 25.

Near the front edge of the flat surface 17 of the movable top are arranged openings for the reception of dowel-pins 32, carried by guards 33, which are placed in position when a heavy book is being examined. When these guards are not in use, they may be readily detached and placed in a slidable drawer 34, carried by the desk-top, the drawer serving also as a receptacle for maps or other articles.

In order to hold the books opened flat for examination, a winding-drum 35 is arranged within the desk-top, said drum carrying a flexible cord or tape 36 and the drum being preferably of the spring-wound type—such, for instance, as are used on tape-measures—and one end of the cord projects out through an opening 37 in the top of the desk and is provided with a ring 38. By pulling the ring the cord or tape may be partly unwound from the drum and passed over the open book, the ring being then placed on a suitable pin or hook 39 near the opposite end of the desk-top. When the ring is removed from the pin or hook, the flexible cord or tape will be immediately rewound by the drum.

Secured to the frame of the desk and slightly spaced inward from the pedestals 10 are vertical partitions 40, which form housings for the side guards or supports 41 of the writing-desk 42, while the tops of said partitions form supports and guides for the writing-desk.

The writing-desk includes a flat rectangular frame 42, the central portion of which is depressed to form a receptacle 43 for stationery and the like, and the recess is covered by a hinged top 44, that forms a supporting-surface for the paper for writing. This top 44 has an opening normally covered by a pivoted plate 46, the opening receiving the ink of an ink-receptacle 47, that is disposed within the recess 43.

The end portions of the front of the frame 42 are pivotally connected to the upper end of a front frame 50, the side bars of which have their lower ends connected by pivot-plates 52 to the stationary part of the frame, preferably at a point immediately below the horizontal plane of the lower stationary shelf 15. To the end bars of the frame 50 are secured the side guards 41, which slide in the housing-spaces between the partitions 40 and the inner faces of the pedestals 10, while the opposite ends of the frame 42 ride on top of said partitions 40, the guards 41 serving as additional counterweights to hold the writing-desk in closed position or in the position shown in Fig. 3 and serving also to maintain the desk in the open position shown in Fig. 4 in accordance with the shifting of the weight of the guards from side to side of the vertical flange of the fulcrum-plates 52. The writing-desk is held from excessive outward movement by engagement of a pin 50', carried by the rear portion of the frame 42, with the inner face of one of the cross-bars 11 of the desk-frame.

In assembling the members of the desk the corner-posts are preferably held in place by means of hollow bolts 51, which also form receivers or holders for the shanks of the desk-casters, so that the latter cannot work loose.

Having thus described the invention, what is claimed is—

1. The combination in a desk, of a main frame, pivot members carried thereby, the top of the frame being arranged on a curved line struck from the center of such pivots, an adjustable top section, arms mounted on such pivots and secured to the top section, a rack carried by the main frame, and a pawl carried by the top section and engaging said rack.

2. The combination in a desk, of the pedestal members, a curved partition connecting the same and forming the top of the main portion of the frame, an adjustable top section, pivoted arms carrying said top section, racks carried by the partition, a rock-shaft, pawls carried by the rock-shaft and engaging the racks, and means for operating said rock-shaft.

3. The combination with a main frame having a curved top portion, of pivot-bolts carried by the frame, arms mounted on the pivot-bolts, a top section secured to the pivot-arms and having its lower face curved to correspond to the curvature of the frame, a rack carried by the frame, a rock-shaft, a pawl arranged on the rock-shaft and engaging the rack, an arm on said rock-shaft, and a rod secured to the arm and having an operating knob or handle arranged at the front of the top section.

4. In a device of the class specified, the combination with the main frame, including pedestals, of partitions or supports arranged between the pedestals, a writing-table frame, and a pivoted carrying-frame therefor, the writing-frame being supported by the guides or partitions, and portions of the carrying-frame being housed between said guides or supports and the pedestals.

5. The combination in a desk, of a main frame including pedestals or uprights, partitions between said pedestals and forming housings, a writing-desk frame guided on top of the partitions, and a supporting-frame having a pivotal connection with the main frame and with the writing-desk frame.

6. In apparatus of the class described, the combination with a main frame, of auxiliary partitions or guides carried by said frame, a pivotally-mounted frame for the support of the writing-desk frame, and a writing-desk frame pivotally mounted on the supporting-frame, said writing-desk frame when in closed position resting on the partitions, and when in open position being carried by said supporting-frame.

In testimony that I claim the foregoing as my own I have hereto affixed my signature in the presence of two witnesses.

EDMUND HIGGINS.

Witnesses:
ALEXANDER R. MACKENZIE,
WILLIAM E. HULETT.